(12) United States Patent
Pop et al.

(10) Patent No.: US 11,230,924 B2
(45) Date of Patent: Jan. 25, 2022

(54) INTERPRETATION OF PRESSURE TEST DATA

(71) Applicant: Schlumberger Technology Corporation, Sugar Land, TX (US)

(72) Inventors: Julian Pop, Houston, TX (US); Cosan Ayan, Istanbul (TR); Adriaan Gisolf, Aberdeen (GB); Juan Miguel La Rotta Marin, Aberdeen (GB); Hua Yu, Beijing (CN); Lei Jiang, Beijing (CN); Youxiang Zuo, Burnaby (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 718 days.

(21) Appl. No.: 15/837,612

(22) Filed: Dec. 11, 2017

(65) Prior Publication Data

US 2018/0171791 A1 Jun. 21, 2018

Related U.S. Application Data

(60) Provisional application No. 62/435,911, filed on Dec. 19, 2016.

(51) Int. Cl.
*E21B 49/10* (2006.01)
*E21B 47/06* (2012.01)
(Continued)

(52) U.S. Cl.
CPC .............. *E21B 49/10* (2013.01); *E21B 47/06* (2013.01); *E21B 49/00* (2013.01); *G01V 99/00* (2013.01);
(Continued)

(58) Field of Classification Search
CPC .... E21B 2049/085; E21B 33/12; E21B 47/06; E21B 49/00; E21B 49/10; E21B 49/0875; G01V 99/00; G01V 99/005
See application file for complete search history.

(56) References Cited

U.S. PATENT DOCUMENTS 7,725,302 B2 5/2010 Ayan et al.
2009/0126475 A1* 5/2009 Zhang .................... E21B 49/00
73/152.05

(Continued)

OTHER PUBLICATIONS

Domzalski et al., Multilayer Modeling to Define a Fluvial Sandstone Reservoir's Dynamic Structure Using Multistation Multiprobe Formation Tester Measurements, SPE 84094, SPE Annual Technical Conference and Exhibition, Oct. 5-8, 2003, Denver, Colorado (16, pages).

(Continued)

*Primary Examiner* — Roy Y Yi
*Assistant Examiner* — Geoffrey T Evans
(74) *Attorney, Agent, or Firm* — Trevor G. Grove (57) ABSTRACT

Apparatus and methods for obtaining initial settings of station-specific parameters descriptive of wellbore/formation properties specific to downhole pressure test stations, and obtaining initial settings of station-shared parameters descriptive of petrophysical properties of petrophysically unique formation zones. A pressure transient model of the zones is obtained by regression utilizing the pressure data of each station and the initial settings of the station-specific and station-shared parameters. The regression analytically determines a model value of at least one of the station-specific parameters and the station-shared parameters.

20 Claims, 5 Drawing Sheets

(51) Int. Cl.
   *G01V 99/00* (2009.01)
   *E21B 49/00* (2006.01)
   *E21B 33/12* (2006.01)
   *E21B 49/08* (2006.01)

(52) U.S. Cl.
   CPC ........... *E21B 33/12* (2013.01); *E21B 49/0875* (2020.05); *G01V 99/005* (2013.01)

(56) References Cited

U.S. PATENT DOCUMENTS

| | | | |
|---|---|---|---|
| 2010/0185393 A1 | 7/2010 | Liang et al. | |
| 2011/0246161 A1* | 10/2011 | Morton | E21B 49/00 703/9 |
| 2015/0176405 A1* | 6/2015 | Corre | E21B 49/081 166/250.02 |

OTHER PUBLICATIONS

Peffer et al., In-Situ Determination of Permeability Anisotropy and its Vertical Distribution—A Case Study, SPE 38942, SPE Annual Technical Conference and Exhibition, Oct. 5-8, 1997, San Antonio, Texas (11 pages).

Domzalski et al., In-Situ Permeability Anisotropy vs. Depth in a Fluvial Sandstone Reservoir Using a Multiprobe Formation Tester, SPE 77342, SPE Annual Technical Conference and Exhibition, Sep. 29-Oct. 2, 2002, San Antonio, Texas (15 pages).

Ayan et al., Simultaneous Analysis of Multiple Formation Tester Transients and Well Tests with an Integrated Well Model. SPE 89993, SPE Annual Technical Conference and Exhibition, Sep. 26-29, 2004. Houston, Texas (14 pages).

Badaam et al., Estimation of Formation Properties Using Multiprobe Formation Tester in Layered Reservoirs, SPE 49141, SPE Annual Technical Conference and Exhibition, Sep. 27-30, 1998, New Orleans, Louisiana (12 pages).

Mustafa et al., Nonlinear Regression Analysis of Well-Test Pressure Data with Uncertain Variance, SPE 62918, SPE Annual Technical Conference and Exhibition, Oct. 1-4, 2000, Dallas, Texas (13 pages).

* cited by examiner

INTERPRETATION OF PRESSURE TEST DATA

CROSS-REFERENCES TO RELATED APPLICATIONS

This application claims priority to U.S. Provisional Patent Application No. 62/435,911, filed on Dec. 19, 2016, which is incorporated in its entirety by reference herein.

BACKGROUND OF THE DISCLOSURE

In order to successfully exploit subterranean hydrocarbon reserves, information about the subterranean formations and formation fluids intercepted by a wellbore is acquired. This information may be acquired via various testing operations and/or sampling operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a processing system having a processor and a memory including computer program code. The processing system is operable to obtain initial settings of station-specific parameters. The station-specific parameters are descriptive of wellbore/formation properties each specific to one of multiple different-depth stations at which pressure test data is obtained by a downhole apparatus positioned in a wellbore penetrating a subterranean formation. Each wellbore/formation property is a property of the wellbore proximate the corresponding station, or a property of the subterranean formation proximate the corresponding station. The processing system is also operable to obtain initial settings of station-shared parameters. The station-shared parameters are descriptive of petrophysical properties of each of multiple petrophysically unique zones of the subterranean formation. The pressure test data at each of the different-depth stations is influenced by the petrophysical properties of at least two of the zones. The processing system is also operable to develop a pressure transient model of the collective zones by performing regression analysis simultaneously utilizing the pressure test data of each of the different-depth stations, the initial settings of the station-specific parameters, and the initial settings of the station-shared parameters. The pressure transient model is based on the station-specific parameters and the station-shared parameters. The regression analysis analytically determines a model value of at least one of the station-specific parameters and the station-shared parameters.

The present disclosure also introduces a method including operating a processing system having a processor and a memory including computer program code. Operating the processing system includes obtaining initial settings of station-specific parameters. The station-specific parameters are descriptive of wellbore/formation properties each specific to one of multiple different-depth stations at which pressure test data is obtained by a downhole apparatus positioned in a wellbore penetrating a subterranean formation. Each wellbore/formation property is a property of the wellbore proximate the corresponding station, or a property of the subterranean formation proximate the corresponding station. Operating the processing system also includes obtaining initial settings of station-shared parameters. The station-shared parameters are descriptive of petrophysical properties of each of multiple petrophysically unique zones of the subterranean formation. The pressure test data at each of the different-depth stations is influenced by the petrophysical properties of at least two of the zones. Operating the processing system also includes developing a pressure transient model of the collective zones by performing regression analysis simultaneously utilizing the pressure test data of each of the different-depth stations, the initial settings of the station-specific parameters, and the initial settings of the station-shared parameters. The pressure transient model is based on the station-specific parameters and the station-shared parameters. The regression analysis analytically determines a model value of at least one of the station-specific parameters and the station-shared parameters.

The present disclosure also introduces an apparatus including a processing system having a processor and a memory including computer program code. The processing system is operable to enable selection of at least one of multiple parameters of a model for determination by a regression analysis. The parameters include station-specific parameters for each of multiple stations in a wellbore at which pressure test data is obtained, and station-shared parameters common to the stations in the wellbore. The stations are at different depths in the wellbore. The processing system is also operable to fit the model to the pressure test data of the stations simultaneously. A model value of the at least one selected parameter is determined by the regression analysis to fit the model to the pressure test data. The processing system is also operable to output information obtained from the model.

The present disclosure also introduces a method including operating a processing system having a processor and a memory including computer program code. Operating the processing system includes selecting at least one parameter of multiple parameters of a model for determination by a regression analysis. The parameters include station-specific parameters for each of multiple stations in a wellbore at which pressure test data is obtained, and station-shared parameters common to the stations in the wellbore. The stations are at different depths in the wellbore. Operating the processing system also includes fitting the model to the pressure test data of the stations simultaneously. A model value of the at least one selected parameter is determined by the regression analysis to fit the model to the pressure test data. Operating the processing system also includes outputting information obtained from the model.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods and/or processes according to one or more aspects of the present disclosure may be used or performed in connection with obtaining and/or interpreting information relating to one or more subterranean formation and/or a wellbore penetrating the one or more subterranean formation, such as a well to obtain hydrocarbons (e.g., oil and/or gas) or water. One or more aspects of the present disclosure may be applied in other contexts, such as for other applications and/or industries.

One or more aspects of the present disclosure may permit simpler and faster interpretation of pressure test data, such as obtained via pressure transient testing, obtained from multiple stations downhole in a wellbore. Generally, according to one or more aspects, a model may be defined dependent on one or more parameters. The model may be fit to the pressure test data that is obtained from the multiple stations using regression to fit the model to the pressure test data of the multiple stations simultaneously. Respective values of one or more selected parameters can be determined by the regression analysis. In some examples, if the model is not fit to obtain a satisfactory result, initial settings, such as initial values and/or constraints, of the parameters can be modified or changed, and the fitting may be performed again based on the changed initial settings. In some example implementations, after values of one or more selected parameters are determined by the regression analysis, the fitting and the regression analysis may be iteratively repeated to determine respective values of another one or more selected parameters.

The parameters can include station-specific parameters and station-shared parameters. The station-specific parameters can be descriptive of wellbore/formation properties each specific to one of the stations at which pressure test data is obtained, where each wellbore/formation property is a property of the wellbore or subterranean formation proximate the corresponding station. The station-shared parameters can be descriptive of petrophysical properties of each of petrophysically unique zones of the subterranean formation.

Figure 1:
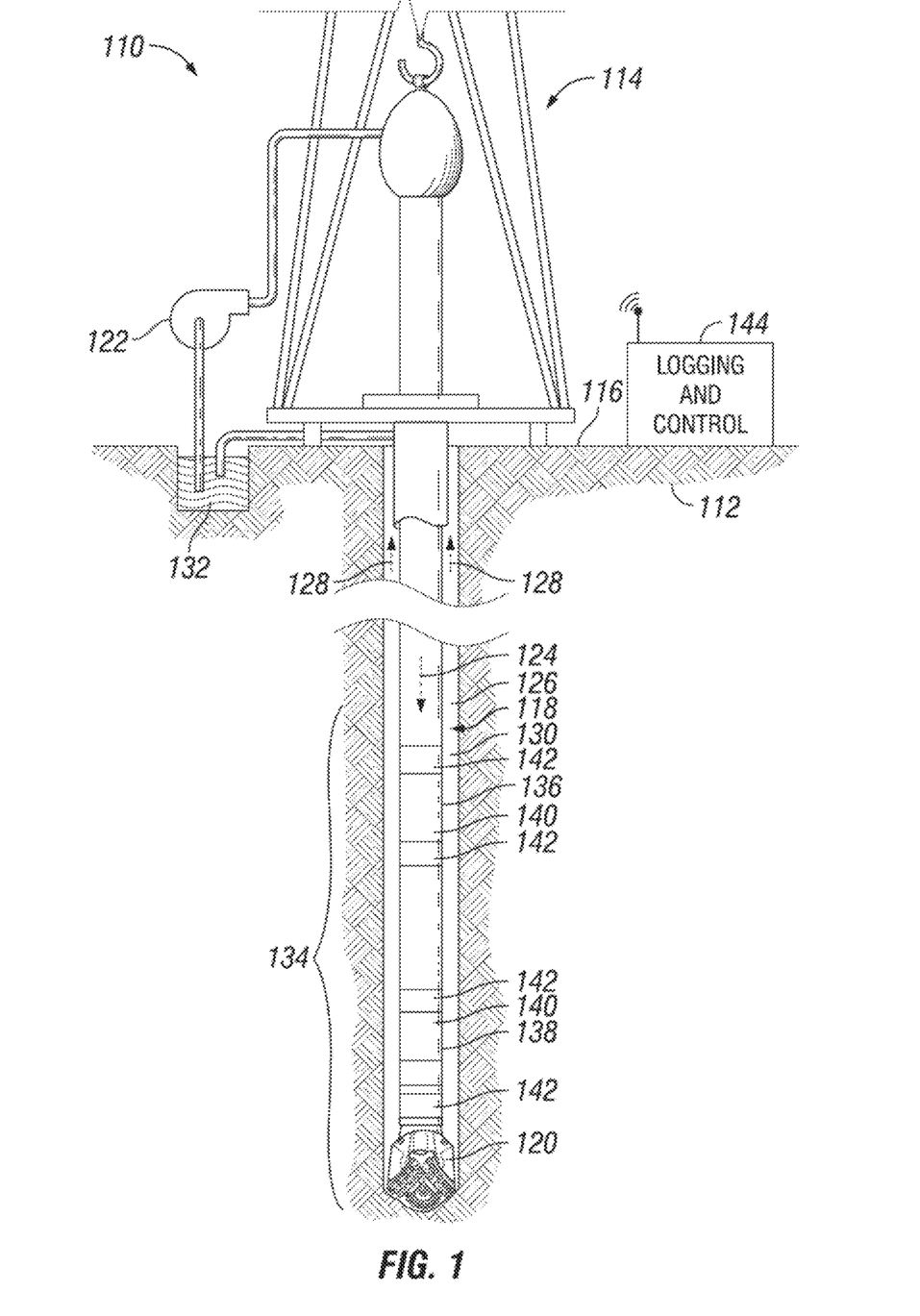
FIG. 1 is a schematic view of at least a portion of an example implementation of apparatus according to one or more aspects of the present disclosure.

FIG. 1 is a schematic view of at least a portion of an example implementation of a drilling system 110 operable to drill a wellbore 126 into one or more subsurface formations 112. One or more aspects described above may be performed by or in conjunction with one or more aspects of the drilling system 110 shown in FIG. 1.

A drilling rig 114 at the wellsite surface 116 is operable to rotate a drill string 118 that includes a drill bit 120 at its lower end. In some examples, the drilling rig 114 may include a kelly mechanically coupled to the drill string 118 that is rotated by a rotary table of the drilling rig to thereby rotate the drill string 118. In other examples, the drilling rig 114 may include a top drive that is mechanically coupled to and rotates the drill string 118. As the drill bit 120 is rotated, a pump 122 pumps drilling fluid, such as oil-based mud (OBM) or water-based mud (WBM) in some examples, downward through the center of the drill string 118 in the direction of arrow 124 to the drill bit 120. The drilling fluid cools and lubricates the drill bit 120 and exits the drill string 118 through ports (not shown) in the drill bit 120. The drilling fluid then carries drill cuttings away from the bottom of the wellbore 126 as it flows back to the wellsite surface 116 through an annulus 130 between the drill string 118 and the subsurface formation 112, as shown by arrows 128. At the wellsite surface 116, the return drilling fluid is filtered and conveyed back to a mud pit 132 for reuse.

The location and environment of the drilling system 110 may vary depending on the subsurface formation 112 penetrated by the wellbore 126. Instead of being a surface operation, for example, the wellbore 126 may be formed under water of varying depths, such as on an ocean bottom surface. Some components of the drilling system 110 may be specially adapted for underwater wells in such instances.

While a drill string 118 is illustrated in FIG. 1, it will be understood that implementations described herein may be applicable or readily adaptable to work strings and wireline tools as well. Work strings may include a length of tubing (e.g., coiled tubing) lowered into the wellbore 126 for conveying well treatments or well servicing equipment. Wireline tools may include formation testing tools suspended from a multi-conductor cable as the cable is lowered into the wellbore 126 to measure formation properties at depths, as described in more detail below.

The lower end of the drill string 118 includes a bottomhole assembly (BHA) 134, which includes the drill bit 120 and a plurality of drill collars 136, 138. The drill collars 136, 138 may include various instruments, such as sample-while-drilling (SWD) tools that include sensors, telemetry equipment, and so forth. The drill collars 136, 138 may also include logging-while-drilling (LWD) modules 140 and/or measurement-while drilling (MWD) modules 142. The LWD modules 140 may include tools operable to measure formation parameters and/or fluid properties, such as resistivity, porosity, permeability, sonic velocity, optical density, pressure, temperature, and/or other example properties. The MWD modules 142 may include tools operable to measure wellbore trajectory, borehole temperature, borehole pressure, and/or other example properties. The LWD modules 140 may each be housed in one of the drill collars 136, 138. The LWD modules 140 include capabilities for measuring, processing, and/or storing information, as well as for communicating with the MWD modules 142 and/or with surface equipment such as, for example, a logging and control unit 144. That is, the SWD tools (e.g., LWD modules 140 and MWD modules 142) may be communicatively coupled to the logging and control unit 144 disposed at the wellsite surface 116. In other implementations, portions of the logging and control unit 144 may be integrated with downhole features.

The LWD modules 140 and/or the MWD modules 142 may comprise or be one or more probe modules and/or packer modules utilized in determining a pressure of a formation fluid in the subsurface formation 112, such as examples described below. The drilling system 110 may be operable to determine, estimate, or otherwise obtain pressure and/or other various properties associated with the formation fluid. These properties may be determined within or communicated to the logging and control unit 144, such as for subsequent utilization as input to various control functions and/or data logs.

Figure 2:
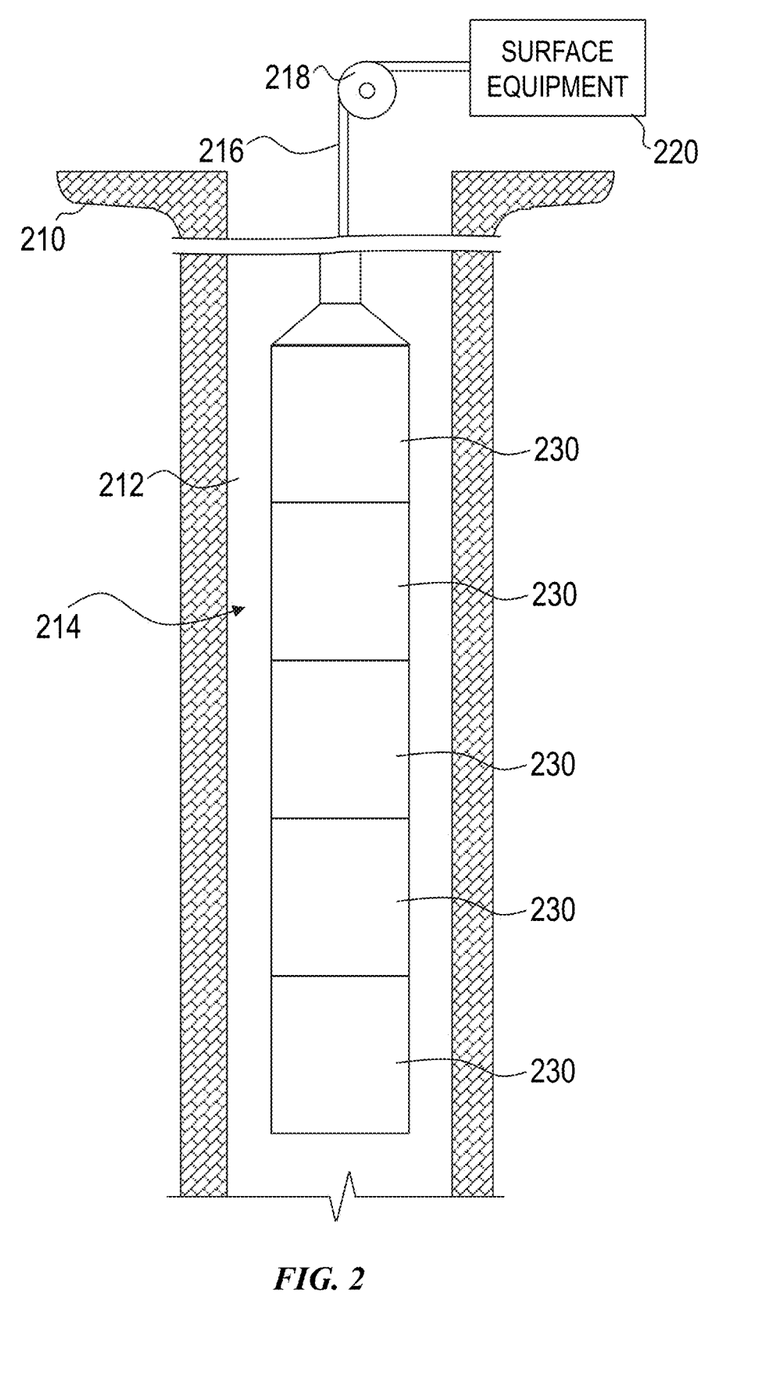
FIG. 2 is a schematic view of at least a portion of an example implementation of apparatus according to one or more aspects of the present disclosure.

FIG. 2 is a schematic diagram of an example implementation of downhole equipment (equipment configured for operation downhole) operable to obtain properties of a fluid from a formation, such as the subsurface formation 210 shown in FIG. 2. The downhole equipment includes an example implementation of a downhole tool 214. The downhole tool 214 is conveyable within the wellbore 212 to the subsurface formation 210 and subsequently operable to obtain properties of a formation fluid from the subsurface formation 210. In the illustrated example implementation, the downhole tool 214 is conveyed in the wellbore 212 via a wireline 216. The downhole tool 214 may be suspended in the wellbore 212 from a lower end of the wireline 216, which may be a multi-conductor cable spooled from a winch 218 at the surface. In some examples, the downhole tool 214 may be conveyed using logging while drilling (LWD) conveyance, one or more tractors conveyance, coiled tubing, and/or tough logging conditions (TLC) conveyance. The wireline 216 may be electrically coupled to wellsite surface equipment 220, such as to communicate various control signals and logging information between the downhole tool 214 and the wellsite surface equipment 220. The wellsite surface equipment 220 shown in FIG. 2 and the logging and control unit 144 shown in FIG. 1, or functions thereof, may be integrated in a single system at the wellsite surface.

The downhole tool 214 includes various modules 230 that together form, at least in part, the downhole tool 214. The modules 230 may comprise, be part of, be substantially similar to, or otherwise have similar functionality relative to one or more of the SWD tools, LWD modules 140, and/or MWD modules 142 shown in FIG. 1 and/or described above, and examples of, such modules are described below. However, other arrangements and/or modules may make up the downhole tool 214.

The modules 230 may include various instruments, such as sensors, telemetry equipment, and so forth. The modules 230 may include tools operable to measure formation parameters and/or fluid properties, such as resistivity, porosity, permeability, sonic velocity, optical density, pressure, temperature, measure wellbore trajectory, borehole temperature, borehole pressure, and/or other example properties. The modules 230 include capabilities for measuring, processing, and/or storing information, as well as for communicating with the other modules 230 and/or with surface equipment 220. That is, the modules 230 may be communicatively coupled to the surface equipment 220 disposed at the wellsite surface.

The modules 230 may comprise or be one or more probe modules and/or packer modules utilized in determining a pressure of a formation fluid in the subsurface formation 210, such as examples described below. The downhole tool 214 may be operable to determine, estimate, or otherwise obtain pressure, flow rate, and/or other various properties associated with the formation fluid and/or one or more formations. These properties may be determined within or communicated to the surface equipment 220, such as for subsequent utilization as input to various control functions and/or data logs.

Figure 3:
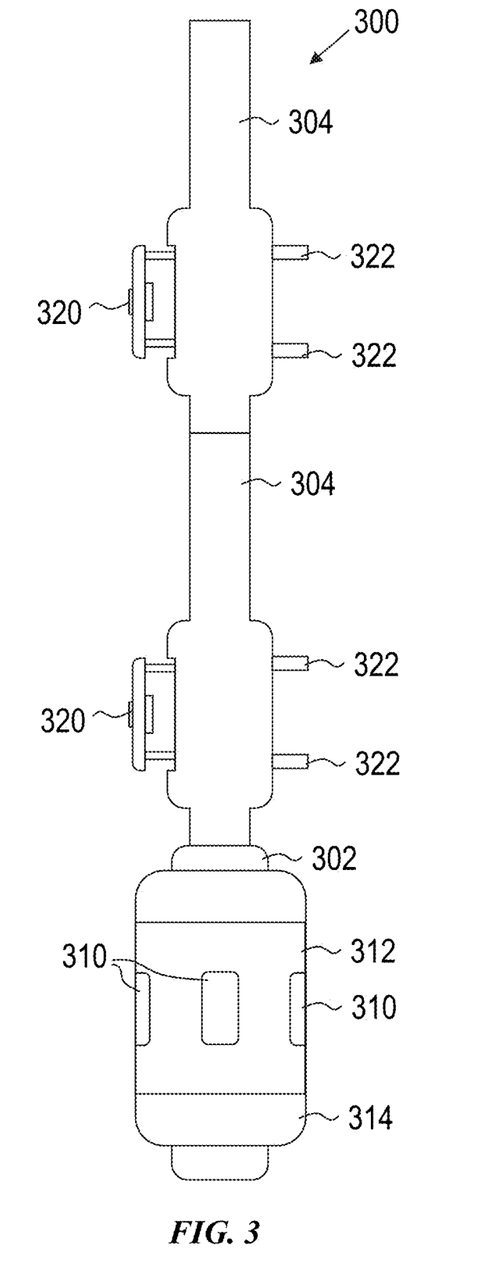
FIG. 3 is a schematic view of at least a portion of an example implementation of apparatus according to one or more aspects of the present disclosure.

FIG. 3 is a schematic view of at least a portion of an example implementation of a configuration 300 of modules for the BHA 134 and/or downhole tool 214 operable to obtain pressure data of a formation fluid of a formation. The configuration 300 comprises a radial multi-probe module 302 and two single-probe modules 304 mechanically coupled together wherein one of the single-probe modules 304 is mechanically coupled and disposed between the radial multi-probe module 302 and the other of the single-probe modules 304. In some examples, the radial multi-probe module 302 may be a Saturn 3D Radial Probe for a Modular Formation Dynamics Tester (MDT) tool available from Schlumberger, and the single-probe module 304 may be a Single-Probe Module (MRPS) for an MDT tool also available from Schlumberger.

The radial multi-probe module 302 comprises a four radially disposed extendable fluid communication lines (radial probes 310) operable to engage a subsurface formation (e.g., engage a sidewall of a wellbore) disposed at equal angles radially (e.g., with 90° between neighboring radial probes 310 when four radial probes 310 are present). The radial probes 310 are further operable to communicate formation fluid from the subsurface formation into the radial multi-probe module 302 and, in some examples, to other modules of the configuration 300. A compliant material 312 is disposed around the radial multi-probe module 302 and around the radial probes 310. An extension mechanism 314 is operable to radially extend to expand the compliant material 312 and extend the radial probes 310 to engage a sidewall of the wellbore. The compliant material 312 may be, for example, rubber that is further operable to facilitate sealing the radial probes 310 with the sidewall of the wellbore when the extension mechanism 314 is extended. The radial multi-probe module 302 may also comprise electronics, batteries, sensors, and/or hydraulic components used, for example, to operate the extension mechanism 314.

Each of the single-probe modules 304 comprises an extendable fluid communication line (probe 320) operable to engage the subsurface formation (e.g., engage a sidewall of the wellbore) and communicate formation fluid from the subsurface formation into the respective single-probe module 304 and, in some examples, to other modules of the configuration 300. Each of the single-probe modules 304 may also comprise one or more setting mechanisms 322. The setting mechanisms 322 are disposed laterally opposed from the probe 320 and may include pistons and/or other apparatus operable to improve sealing engagement and thus fluid communication between the subsurface formation and the probe 320. Each of the single-probe modules 304 may also comprise electronics, batteries, sensors, and/or hydraulic components used, for example, to operate the probe 320 and/or the corresponding setting mechanisms 322.

In the illustration of FIG. 3, the probes 310, 320, the extension mechanism 314, and the setting mechanisms 322 are illustrated in extended states such that each may engage a sidewall of a wellbore for receiving a formation fluid. As the tool of which the configuration 300 is at least a part is conveyed in the wellbore, the probes 310, 320, the extension mechanism 314, and the setting mechanisms 322 may be in a retracted state to permit conveyance of the tool down the wellbore without becoming stuck on a sidewall of the wellbore.

Figure 4:
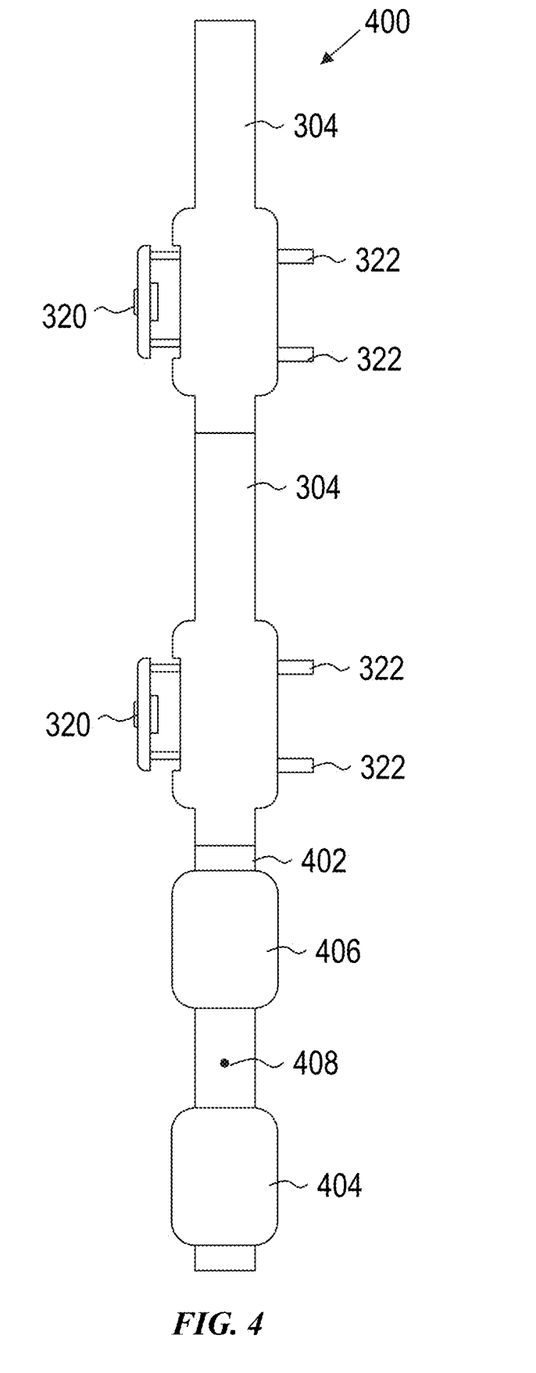
FIG. 4 is a schematic view of at least a portion of an example implementation of apparatus according to one or more aspects of the present disclosure.

FIG. 4 is a schematic view of at least a portion of an example implementation of a configuration 400 of modules for the BHA 134 and/or downhole tool 214 operable to obtain pressure data of a formation fluid of a formation. The configuration 400 comprises a dual-packer module 402 and two single-probe modules 304 mechanically coupled together wherein one of the single-probe modules 304 is mechanically coupled and disposed between the dual-packer module 402 and the other of the single-probe modules 304. In some examples, the dual-packer module 402 may be a Dual-Packer Module (MRPA) for an MDT tool available from Schlumberger. The single-probe modules 304 were previously described above with respect to FIG. 3.

The dual-packer module 402 comprises a lower packer element 404 and an upper packer element 406 that each are inflatable to engage with a sidewall of a wellbore. One or more ports 408 are in the dual-packer module 402 and between the lower packer element 404 and the upper packer element 406 for fluidly communicating a formation fluid into the dual-packer module 402. The lower packer element 404 and the upper packer element 406 are operable to inflate to engage the sidewall of the wellbore and thereby isolate a section of the wellbore. A formation fluid may be obtained through the port 408 from the isolated section of the wellbore.

In the illustration of FIG. 4, the packer elements 404, 406, the probes 320, and the setting mechanisms 322 are illustrated in inflated or extended states such that each may engage a sidewall of a wellbore for receiving a formation fluid. As the tool of which the configuration 400 is at least a part is conveyed in the wellbore, the packer elements 404, 406, the probes 320, and the setting mechanisms 322 may be in a deflated or retracted state to permit conveyance of the tool down the wellbore without becoming stuck on a sidewall of the wellbore.

Referring collectively to the configurations 300, 400 of FIGS. 3 and 4, each of the modules 302, 304, 402 can include various conduits and flow lines for communicating formation fluid in and/or through the respective modules 302, 304, 402 and to other modules of the tool. Additionally, each of the modules 302, 304, 402 can include various fluid valves in the conduits and flow lines that are operable to direct formation fluid as appropriate for a given operation.

Each of the modules 302, 304, 402 include a drawdown chamber with one or more pressure sensors for each respective probe 310, 320 or port 408 of the modules 302, 304, 402. The drawdown chamber may be fluidly coupled to the respective probe 310, 320 or port 408, such as by one or more conduits and/or flow lines. During pressure testing, the drawdown chamber may be fluidly isolated with the respective probe 310, 320 or port 408 from any other conduits and/or flow lines, such as through operation of one or more fluid valves. With the respective probe 310, 320 engaging a sidewall of the wellbore or the packer elements 404, 406 inflated to isolate a section of the wellbore, the drawdown chamber may increase a volume of a receiving chamber for receiving formation fluid via the respective probe 310, 320 or port 408, which volume increase may occur by movement of a piston assembly in the drawdown chamber. The pressure sensor is fluidly coupled to the receiving chamber and is operable to obtain pressure data of the formation fluid received in the receiving chamber of the drawdown chamber. The pressure testing may occur over a duration of time, and hence, the pressure data may be obtained with respect to time.

In the example configurations 300, 400 of FIGS. 3 and 4, the probes 310, 320 and/or port 408 may be for various purposes of the pressure testing. For example, one or more of the radial probes 310 may be a sink probe, and one or more others of the radial probes 310 may be an observation probe, which together can be used to obtain a horizontal permeability of the formation into which the wellbore extends. Similarly, the port 408 may be a sink probe. Further, the probes 320 may be observation probes, which with the sink probe (e.g., one or more of the radial probes 310 or port 408) may be used to obtain a vertical permeability of the formation into which the wellbore extends.

Other example implementations may use other configurations and different arrangements of modules. For example, as modifications to the configuration 300 of FIG. 3, an example configuration may comprise two single-probe modules 304 mechanically coupled together and without a radial multi-probe module 302, and another example configuration may comprise a radial multi-probe module 302 and no more than one single-probe module 304 mechanically coupled together. Further, as modifications to the configuration 400 of FIG. 4; an example configuration may comprise a dual-packer module 402 without a single-probe module 304, and another example configuration may comprise a dual-packer module 402 and no more than one single-probe module 304 mechanically coupled together. Even further, a tool may comprise multiple instances of any of the configurations 300, 400, the above-described modifications to the configurations 300, 400, and/or other example configurations. A person having ordinary skill in the art will understand how such modifications may be operable for pressure testing.

As previously stated, a tool, such as the BHA 134 or downhole tool 214, can include modules in addition to the modules of the configurations 300, 400 and/or other example configurations. Some example modules that may be included in the tool include a power module, one or more pumpout modules, sample modules, a live fluid analyzer (LFA) module, and/or other example modules. The power module may provide electrical and/or hydraulic power. For example, an alternating current electrical power may be supplied to the power module from the surface through a wireline, and the power module may convert the alternating current electrical power to direct current electrical power that is supplied through electrical conductors to various modules of the tool. In another example, the power module may comprise batteries or other power sources to provide electrical power through electrical conductors to various modules of the tool. The power module may include a hydraulic pump that may be used to communicate hydraulic fluid through various modules, such as to extend and retract the probes 310, 320, extension mechanism 314, and setting mechanisms 322.

A pumpout module may comprise a pump operable to draw formation fluid in through one or more probes and/or ports, such as the probes 310, 320 and/or port 408, and pushes the fluid through a flowline of the tool, which flowline may extend through various modules of the tool as described above. Power may be supplied to the pump via other components located in the pumpout module, or via a power module. A sample module may comprise one or more sample bottles for collecting samples of the formation fluid. The sample bottles may be fluidly coupled to the flowline such that during a sample collection operation, the pump pushes formation fluid through the flowline and into the sample bottles. An LFA module may detect properties of formation fluid obtained from the flowline. The LFA module may include a spectrometer, a gas refractometer, and/or other example sensors, such as a density sensor, a viscosity sensor, a pressure sensor, a temperature sensor, and/or a saturation pressure sensor. The LFA may collect data that may be utilized to estimate a formation volume factor (FVF) of the formation fluid, density, optical density, gas-oil ratio, compressibility, saturation pressure, viscosity, and/or mass fractions of compositional components of the formation fluid and/or contaminants therein (e.g., OBM filtrate), among others.

The various modules of the tool may comprise various sensors and/or functionalities similar to and/or different from described above. Some modules may incorporate functionalities of different modules described above. Some modules may include less functionality than described above. Various modifications and/or alterations are within the scope of the present disclosure.

The following method or process may permit interpretation of pressure test data obtained in a wellbore. The method or process is described in the context of devices and components described above, although in other implementations, methods or processes within the scope of this disclosure may be performed in the context of other devices and components. The method or process described below is presented in a given order, although other implementations also within the scope of the present disclosure may comprise the described and/or other method or process in other orders and/or in parallel. Various other modifications to the method or process described below may also be consistent with the scope of the present disclosure. For example, such implementations may include additional or fewer calculations, determinations, computations, logic, and/or other aspects.

Figure 5:
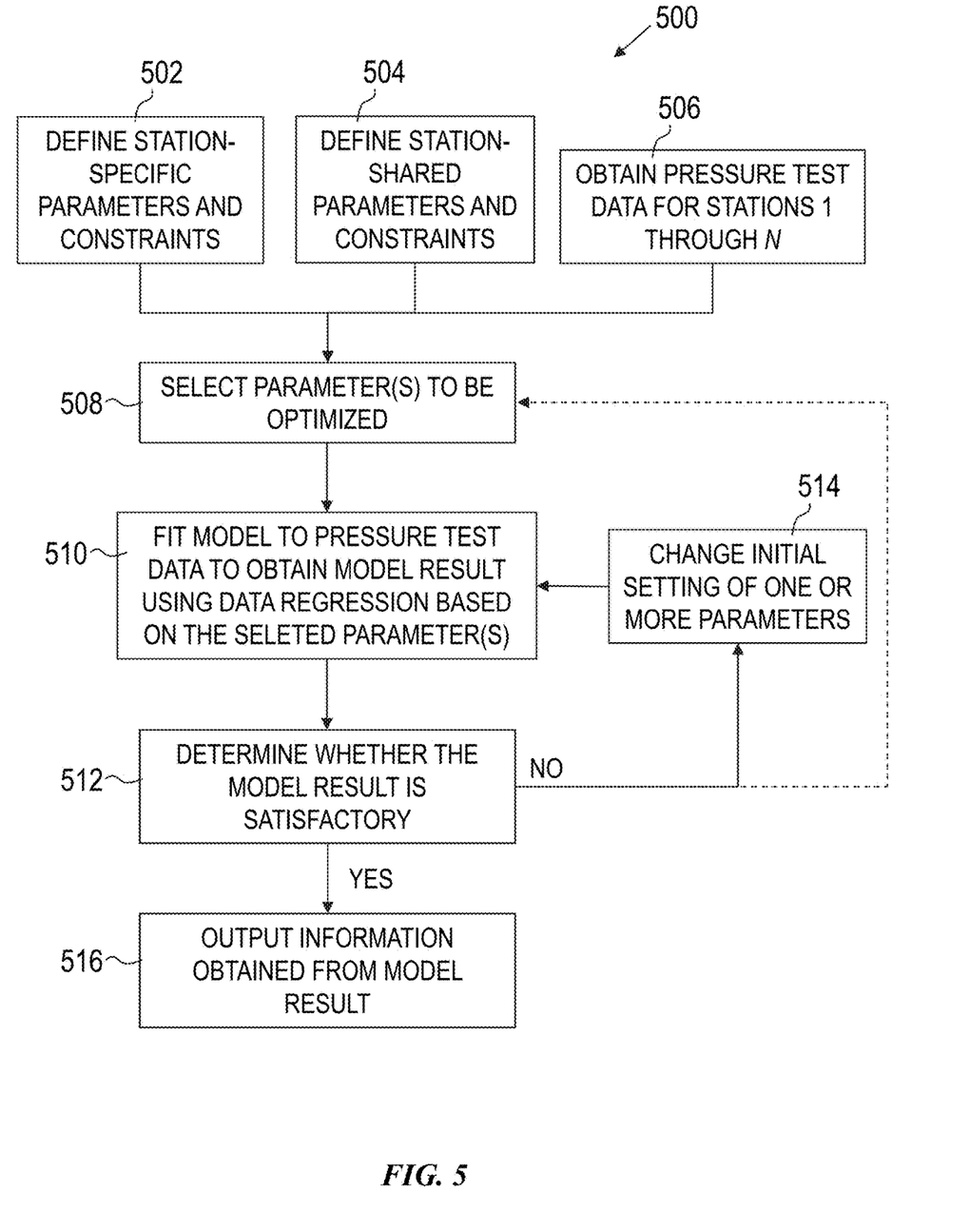
FIG. 5 is a flow-chart diagram of at least a portion of an example implementation of a method according to one or more aspects of the present disclosure.

FIG. 5 is a flow-chart diagram of at least a portion of an example implementation of a method (500) for interpreting pressure data according to one or more aspects of the present disclosure. The method (500) includes defining (502) station-specific parameters and constraints and defining (504) station-shared parameters and constraints. A model may be used to estimate and/or determine values of the station-specific parameters and station-shared parameters. The model may depend on the station-specific parameters and station-shared parameters, such as including a mathematical expression of pressure as a function of time that is dependent on the station-specific parameters and station-shared parameters.

The station-specific parameters include parameters that may be unique to the corresponding station (e.g., depth in a wellbore at which pressure testing occurs) and may be descriptive of one or more properties of the wellbore and/or formation proximate the corresponding station. Some example station-specific parameters may include zone thickness of a zone, skin damage of the formation, compressibility of a formation fluid, a wellbore pressure in the wellbore, an initial pressure of the formation fluid, and/or other example parameters.

The station-shared parameters include parameters that may be common between multiple stations and may be descriptive of petrophysical properties of each of a plurality of petrophysically unique zones of the one or more formations. Some example station-shared parameters may include a depth of a top of a zone in the formation, a depth of a bottom of the zone, a thickness of the zone, a horizontal permeability of the formation, a vertical permeability of the formation, a porosity of the formation, a viscosity of a formation fluid of the formation, a total compressibility of the formation fluid, and/or other example parameters.

Defining (502, 504) the station-specific parameters and the station-shared parameters may include providing an initial setting for each of the parameters. The initial setting may be a basis for initiating a regression analysis subsequently performed. Further, defining (502, 504) the constraints of the parameters can include, for example, setting a range (e.g., having one or both of a minimum value and a maximum value) in which the respective parameter may be varied during the regression analysis. Defining (502, 504) the parameters and constraints may be based on an interpretation of petrophysics logs and/or geological log images and/or estimation of values based on petrophysics logs, for example. For example, such petrophysics logs may indicate various zones in the one or more subterranean formations that the wellbore penetrates. Additionally, information and/or properties that may have been previously determined from nearby wellbores may be used to define the parameters and constraints, since, in some instances, nearby wells may share the same properties as the wellbore under investigation.

The method (500) also includes obtaining (506) pressure test data for multiple stations (e.g., station 1 through station 1V). The pressure test data can be generated by performing pressure testing at each of the multiple stations. The pressure testing may comprise or be Interval Pressure Transient Testing (IPTT), Vertical Interference Testing (VIT), and/or other example pressure testing, and may be performed by utilizing a configuration 300, 400 or another example configuration of a tool, such as described above. With some configurations, pressure testing may be performed at different stations simultaneously, and in other examples, pressure testing may be performed at the multiple stations sequentially. In some example implementations, depending on the configuration of the tool used and the depths of the stations, portions of the configuration may overlap between stations during pressure testing. For example, considering two stations (an upper station and a lower station), an engagement position on the wellbore by an observation probe of the tool while pressure testing is performed at the lower station may overlap with (e.g., be at or above) an engagement position on the wellbore by a sink probe when pressure testing is performed at the upper station. In some examples, overlap may not occur between stations of the pressure testing. The pressure test data may include pressure and/or flow rate readings at various times and may be represented as a change in pressure as a function of a change in time and as a derivative of the change in pressure, for example.

The method (500) includes selecting (508) one or more station-specific and/or station-shared parameters to be optimized and fitting (510) the model to the pressure test data to obtain a model result using regression based on the selected parameter(s). The selecting (508) identifies which one or more of the station-specific parameters and station-shared parameters are variables and are to be determined during the fitting (510). Other non-selected parameters can remain fixed or constant during the fitting (510). In some examples, a single parameter can be selected, while in other examples, multiple parameters can be selected.

The fitting (510) fits the model to the pressure test data from the multiple stations simultaneously to obtain the model result. The fitting (510) uses regression to determine values and/or other information of the one or more selected parameters within the constraints that were defined (502, 504). The model result may therefore model the pressure test data for each of the multiple stations based on a single regression analysis. Because regression analysis may be used, the fitting (510) may be analytical or numerical. The regression analysis may include a maximum likelihood analysis, a generalized least squares analysis, a weighted least squares analysis, an unweighted least squares analysis, and/or other example regression analysis techniques. In some examples, a constrained inversion minimization analysis may be used instead of or in addition to a regression technique, and an example constrained inversion minimization analysis is described in U.S. Patent Publication 2010/0185393, which is incorporated herein by reference in its entirety.

The method (500) includes determining (512) whether the model result is satisfactory. For example, the model result can be represented on a graph or chart with the pressure test data, such as on a log-log curve. A user can visualize how closely the model result fits to the pressure test data, and if the user is not satisfied with how closely the model result fits to the pressure test data, the model result can be unsatisfactory. In other examples, a deviation (e.g., standard deviation) of the model result from the pressure test data can be determined, and if the deviation exceeds a predefined threshold, the model result can be unsatisfactory. Other methods for determining whether the model result is satisfactory may be used.

The method (500) includes if the model results are determined (512) to be unsatisfactory, changing (514) initial settings of one or more of the station-specific and/or station-shared parameters and fitting (510) the model to the pressure test data. The initial settings that may be changed (514) can include the initial values assigned to the parameters and/or the constrains of the parameters. With the change of the initial settings, the regression analysis may determine values and/or other information of the one or more selected parameters differently, which may lead to a satisfactory model result.

In some instances, a satisfactory result may not be obtained after, for example, multiple iterations of the fitting (510), determining (512), and changing (514). When such instances occur, the unsatisfactory result may be indicative of a property of the one or more subterranean formations. For example, an isolation layer may be between and separate zones in the one or more subterranean formations if a satisfactory result cannot be obtained after multiple iterations.

In some example implementations, the model result may be determined (512) to be satisfactory based on the one or more selected parameters, but the model result may further be optimized based on other parameters. In such an instance, the method (500) may include selecting (508) one or more other parameters to be optimized, wherein the values of the one or more previously selected parameters remain fixed or constant based on what was determined from the previous fitting (510). The method (500) may include fitting (510) the model based on the newly selected parameters. The method (500) may include determining (512) whether the model result is satisfactory. These operations may be repeated until the parameters that are to be optimized are selected and utilized as a basis for the fitting (510).

The method (500) may include outputting (516) information obtained from the model result. The information can be the values and/or information of the parameters that were optimized by the fitting (510), for example. In some examples, information may be extracted from the model and/or the determined values of parameters, which may be output (516). Example information can include respective depths of tops of zones in the formation, respective depths of bottoms of the zones, thicknesses of the zones, horizontal permeabilities of the formation in the zones, vertical permeabilities of the formation in the zones, porosity of the formation in the zones, viscosity of a formation fluid of the formation in the zones, total compressibility of the formation fluid in the zones, skin damage of the formation at the stations, compressibility of a formation fluid at the stations, a wellbore pressure in the wellbore at the stations, an initial pressure of the formation fluid at the stations, and/or other example parameters.

Figure 6:
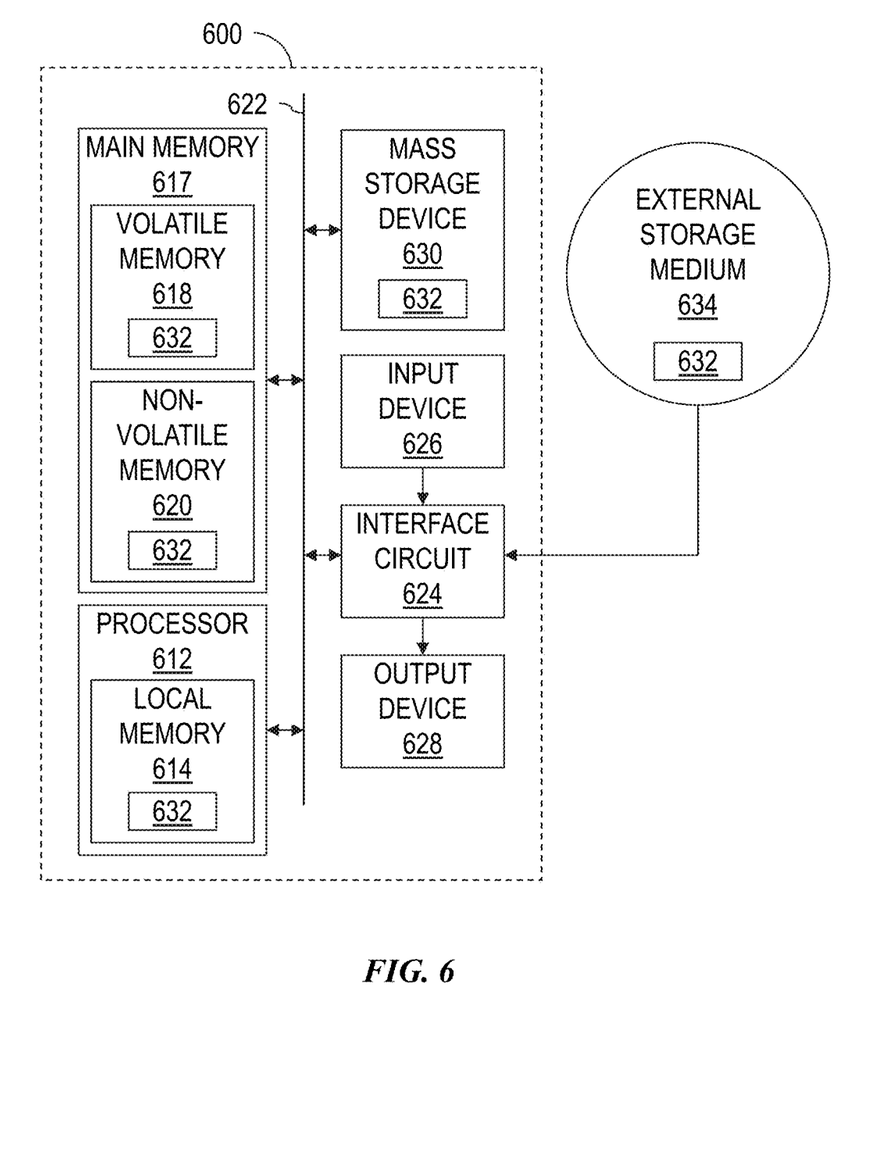
FIG. 6 is a schematic view of at least a portion of an example implementation of apparatus according to one or more aspects of the present disclosure.

FIG. 6 is a schematic view of at least a portion of an example implementation of a processing system 600 according to one or more aspects of the present disclosure. The processing system 600 may execute example machine-readable instructions to implement at least a portion of one or more of the methods and/or processes described herein.

The processing system 600 may be or comprise, for example, one or more processors, controllers, special-purpose computing devices, server devices, personal computers, personal digital assistant (PDA) devices, tablets, smartphones, network appliances, industrial computer, and/or other types of computing devices. The processing systems 600 can be housed in a control room at the well site, off-site remote from the well site, and/or have functionality distributed between various locations. The processing system 600 and its functionalities can be in a single device or distributed across multiple devices.

The processing system 600 comprises a processor 612 such as, for example, a general-purpose programmable processor. The processor 612 may comprise a local memory 614, and may execute program code instructions 632 present in the local memory 614 and/or in another memory device. The processor 612 may execute, among other things, machine-readable instructions or programs to implement the methods and/or processes described herein. The programs stored in the local memory 614 may include program instructions or computer program code that, when executed by an associated processor, enable functionality of one or more aspects of one or more processes and/or methods as described herein. The processor 612 may be, comprise, or be implemented by one or more processors of various types operable in the local application environment, and may include one or more general purpose processors, special-purpose processors, microprocessors, digital signal processors (DSPs), field-programmable gate arrays (FPGAs), application-specific integrated circuits (ASICs), processors based on a multi-core processor architecture, and/or other processors. More particularly, examples of a processor 612 include one or more INTEL microprocessors, microcontrollers from the ARM and/or PICO families of microcontrollers, embedded soft/hard processors in one or more FPGAs, etc.

The processor 612 may be in communication with a main memory 617, such as via a bus 622 and/or other communication means. The main memory 617 may comprise a volatile memory 618 and a non-volatile memory 620. The volatile memory 618 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 620 may be, comprise, or be implemented by a tangible, non-transitory storage medium, such as read-only memory, flash memory and/or other types of memory devices. One or more memory controllers (not shown) may control access to the volatile memory 618 and/or the non-volatile memory 620.

The processing system 600 may also comprise an interface circuit 624 connected and communicatively coupled to the bus 622. The interface circuit 624 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 624 may also comprise a graphics driver card. The interface circuit 624 may also comprise a communication device such as a modem or network interface card to facilitate exchange of data with external computing devices via a network, such as via Ethernet connection, digital subscriber line (DSL), telephone line, coaxial cable, cellular telephone system, and/or satellite, among other examples.

One or more input devices 626 may be connected to the interface circuit 624. One or more of the input devices 626 may permit a user to enter data and/or commands for utilization by the processor 612. Each input device 626 may be, comprise, or be implemented by a keyboard, a mouse, a touchscreen, a track-pad, a trackball, an image/code scanner, and/or a voice recognition system, among other examples.

One or more output devices 628 may also be connected to the interface circuit 624. One or more of the output device 628 may be, comprise, or be implemented by a display device, such as a liquid crystal display (LCD), a light-emitting diode (LED) display, and/or a cathode ray tube (CRT) display, among other examples. One or more of the output devices 628 may also or instead be, comprise, or be implemented by a printer, speaker, and/or other examples.

The processing system 600 may also comprise a mass storage device 630 for storing machine-readable instructions and data. The mass storage device 630 may be connected to the interface circuit 624, such as via the bus 622. The mass storage device 630 may be or comprise a tangible, non-transitory storage medium, such as a floppy disk drive, a hard disk drive, a compact disk (CD) drive, and/or digital versatile disk (DVD) drive, among other examples. The program code instructions 632 may be stored in the mass storage device 630, the volatile memory 618, the non-volatile memory 620, the local memory 614, and/or on a removable storage medium 634, such as a CD or DVD.

The modules and/or other components of the processing system 600 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
   a downhole apparatus configured to be positioned within a wellbore penetrating a subterranean formation, wherein the downhole apparatus is operable to obtain pressure test data at a plurality of different-depth stations; and
   a processing system comprising a processor and a memory including computer program code, wherein the processing system is operable to:
      obtain initial settings of station-specific parameters, wherein:
         the station-specific parameters are descriptive of wellbore/formation properties each specific to one of the plurality of different-depth stations at which pressure test data is obtained by the downhole apparatus positioned in the wellbore penetrating the subterranean formation; and
         each wellbore/formation property is:
            a property of the wellbore proximate the corresponding station; or
            a property of the subterranean formation proximate the corresponding station;
      obtain initial settings of station-shared parameters; wherein:
         the station-shared parameters are descriptive of petrophysical properties of each of a plurality of petrophysically unique zones of the subterranean formation; and
         the pressure test data at each of the plurality of different-depth stations is influenced by the petrophysical properties of at least two of the zones; and
      develop a pressure transient model of the collective zones by performing regression analysis utilizing the pressure test data of each of the plurality of different-depth stations simultaneously, the initial settings of the station-specific parameters, and the initial settings of the station-shared parameters, wherein:
         the pressure transient model is based on the station-specific parameters and the station-shared parameters; and
         the regression analysis analytically determines a model value of at least one of the station-specific parameters and the station-shared parameters.

2. The apparatus of claim 1 wherein the processing system is further operable to determine estimated values of each petrophysical property in each of the zones utilizing the pressure transient model of the collective zones.

3. The apparatus of claim 1 wherein the processing system is further operable to receive an indication of which of the station-specific parameters and the station-shared parameters is utilized during the regression analysis.

4. The apparatus of claim 1 wherein the downhole apparatus is operable to obtain the pressure test data at each of the plurality of different-depth stations simultaneously.

5. The apparatus of claim 1 wherein the downhole apparatus is operable to obtain the pressure test data at each of the plurality of different-depth stations sequentially.

6. The apparatus of claim 1 wherein the initial settings of the station-specific parameters include estimated or measured values, value ranges, or a combination thereof of the wellbore/formation properties.

7. The apparatus of claim 1 wherein the initial settings of the station-shared parameters include estimated or measured values, value ranges, or a combination thereof of the petrophysical properties.

8. The apparatus of claim 1 wherein the processing system is further operable to iteratively:
   enable changing one or more of the initial settings of the station-specific parameters and the station-shared parameters; and
   develop the pressure transient model by performing the regression analysis utilizing the pressure test data of each of the plurality of different-depth stations simultaneously and the changed one or more of the initial settings of the station-specific parameters and the station-shared parameters.

9. The apparatus of claim 1 wherein the processing system is further operable to iteratively develop the pressure transient model of the collective zones by performing the regression analysis utilizing the pressure test data of each of the plurality of different-depth stations simultaneously, the initial settings of the station-specific parameters, and the initial settings of the station-shared parameters, and wherein the regression analysis analytically determines a model value of a different at least one of the station-specific parameters and the station-shared parameters.

10. The apparatus of claim 1, wherein the processing system is further operable to output the model value of the at least one of the station-specific parameters and the station-shared parameters to an output device comprising a display, a printer, a speaker, or a combination thereof, wherein the model value comprises respective depths of tops of zones in the subterranean formation, respective depths of bottoms of the zones in the subterranean formation, thicknesses of the zones, horizontal permeabilities of the subterranean formation in the zones, vertical permeabilities of the subterranean formation in the zones, porosity of the subterranean formation in the zones, viscosity of a formation fluid of the subterranean formation in the zones, total compressibility of the subterranean formation fluid in the zones, skin damage of the subterranean formation at the stations, compressibility of a formation fluid at the stations, a wellbore pressure in the wellbore at the stations, an initial pressure of the formation fluid at the stations, or a combination thereof.

11. A method comprising:
    positioning a downhole apparatus within a wellbore penetrating a subterranean formation;
    operating the downhole apparatus to obtain pressure test data at a plurality of different-depth stations;
    transferring the pressure test data obtained at the plurality of different-depth stations to a processing system comprising a processor and a memory including computer program code; and
    operating the processing system to determine a model value of at least one station-specific parameter, at least one station-shared parameter, or a combination thereof, wherein operating the processing system comprises:
       obtaining initial settings of the station-specific parameters, wherein:
          the station-specific parameters are descriptive of wellbore/formation properties each specific to one of the plurality of different-depth stations at which the pressure test data is obtained by the downhole apparatus; and
          each wellbore/formation property is:
             a property of the wellbore proximate the corresponding station; or
             a property of the subterranean formation proximate the corresponding station;
       obtaining initial settings of the station-shared parameters; wherein:
          the station-shared parameters are descriptive of petrophysical properties of each of a plurality of petrophysically unique zones of the subterranean formation; and
          the pressure test data at each of the plurality of different-depth stations is influenced by the petrophysical properties of at least two of the zones; and
       developing a pressure transient model of the collective zones by performing regression analysis utilizing the pressure test data of each of the plurality of different-depth stations simultaneously, the initial settings of the station-specific parameters, and the initial settings of the station-shared parameters, wherein:
          the pressure transient model is based on the station-specific parameters and the station-shared parameters; and
          the regression analysis analytically determines a model value of at least one of the station-specific parameters and the station-shared parameters.

12. The method of claim 11 wherein operating the processing system further comprises determining estimated values of each petrophysical property in each of the zones utilizing the pressure transient model of the collective zones.

13. The method of claim 11 wherein operating the processing system further comprises receiving an indication of which of the station-specific parameters and the station-shared parameters is utilized during the regression analysis.

14. The method of claim 11 wherein the pressure test data is obtained by the downhole apparatus at each of the plurality of different-depth stations simultaneously.

15. The method of claim 11 wherein the pressure test data is obtained by the downhole apparatus at each of the plurality of different-depth stations sequentially.

16. The method of claim 11 wherein the initial settings of the station-specific parameters include estimated or measured values, value ranges, or a combination thereof of the wellbore/formation properties.

17. The method of claim 11 wherein the initial settings of the station-shared parameters include estimated or measured values, value ranges, or a combination thereof of the petrophysical properties.

18. The method of claim 11 wherein operating the processing system further comprises iteratively:
    changing one or more of the initial settings of the station-specific parameters and the station-shared parameters; and
    developing the pressure transient model by performing the regression analysis utilizing the pressure test data of each of the plurality of different-depth stations simultaneously and the changed one or more of the initial settings of the station-specific parameters and the station-shared parameters.

19. The method of claim 11 wherein operating the processing system further comprises iteratively developing the pressure transient model of the collective zones by performing the regression analysis utilizing the pressure test data of each of the plurality of different-depth stations simultaneously, the initial settings of the station-specific parameters, and the initial settings of the station-shared parameters, and wherein the regression analysis analytically determines a model value of a different at least one of the station-specific parameters and the station-shared parameters.

20. The method of claim 11, further comprising outputting the model value of the at least one of the station-specific parameters and the station-shared parameters to an output device comprising a display, a printer, a speaker, or a combination thereof, wherein the model value comprises respective depths of tops of zones in the subterranean formation, respective depths of bottoms of the zones in the subterranean formation, thicknesses of the zones, horizontal permeabilities of the subterranean formation in the zones, vertical permeabilities of the subterranean formation in the zones, porosity of the subterranean formation in the zones, viscosity of a formation fluid of the subterranean formation in the zones, total compressibility of the subterranean formation fluid in the zones, skin damage of the subterranean formation at the stations, compressibility of a formation fluid at the stations, a wellbore pressure in the wellbore at the stations, an initial pressure of the formation fluid at the stations, or a combination thereof.

* * * * *